US011996072B2

(12) United States Patent
Chiang

(10) Patent No.: US 11,996,072 B2
(45) Date of Patent: May 28, 2024

(54) WIND CHIME

(71) Applicant: Live Oak (Yiwu) Co., Ltd., Jinhua (CN)

(72) Inventor: Chih Chen Chiang, Jinhua (CN)

(73) Assignee: LIVE OAK (YIWU) CO., LTD., Jinhua (CN)

(*) Notice: Subject to any disclaimer, the term of this patent is extended or adjusted under 35 U.S.C. 154(b) by 282 days.

(21) Appl. No.: 17/563,172

(22) Filed: Dec. 28, 2021

(65) Prior Publication Data

US 2022/0215823 A1 Jul. 7, 2022

(30) Foreign Application Priority Data

Jan. 4, 2021 (CN) ........................ 202120002567.8

(51) Int. Cl.
*G10K 1/072* (2006.01)

(52) U.S. Cl.
CPC .................................... *G10K 1/072* (2013.01)

(58) Field of Classification Search
CPC ............ G10K 1/072; G10K 1/00; G10K 1/06; G10K 1/07; G10K 1/071; G10K 1/074; G10K 1/08
See application file for complete search history.

(56) References Cited

U.S. PATENT DOCUMENTS 6,833,502 B1 * 12/2004 Boatner .................. G10K 1/07 84/404

* cited by examiner

*Primary Examiner* — Kimberly R Lockett
(74) *Attorney, Agent, or Firm* — McClure, Qualey & Rodack, LLP

(57) ABSTRACT

A novel wind chime, whereby deficiencies in the prior art, for example, it is necessary to drill holes in the wind chime tubes and grind the holes, which consumes time and man-power, affects beauty of the wind chime, deteriorates tone quality thereof and is liable to cause safety hazards, are addressed, and the wind chime, including a connection ring, a plurality of suspension cords passing the connection ring, a hanger connected at upper ends of the plurality of suspension cords, a striker connected at lower ends of the plurality of suspension cord and a plurality of wind chime tubes, jump rings are connected respectively at the lower ends of the plurality of suspension cords, limiting and connection structures are respectively provided between central positions of the jump rings and the plurality of suspension cords, and the jump rings are connected at inner sides of the plurality of wind chime tubes.

12 Claims, 8 Drawing Sheets

WIND CHIME

TECHNICAL FIELD

The present invention relates to the technical field of decorations, and especially a novel wind chime.

BACKGROUND TECHNOLOGY

Wind chimes are articles that can produce sounds when blown by air and are usually used as ornaments. The wind chimes can produce sounds by strikes among bells or other articles when air blows. There are many types of wind chimes, such as Japanese furins and octagon wind chimes. The wind chimes are visually beautiful, and acoustically pleasant, and serve as both household decorations and important religious utensils.

The wind chimes are usually made by hanging and combining several wind chime tubes on a connection piece with at least one suspension cord, and for the wind chime tubes commercially available, it is usually necessary to drill holes on surfaces of the wind chime tubes so as to plug pins for tying the suspension cord, or to install grommets on openings of the wind chime tubes to connect the suspension cord with the grommets, however, when drilling the holes, some marks are present on external sides of the wind chime tubes, overall appearances of external sides of the wind chime tubes will be affected, which will deteriorate beauty of the wind chimes, and after drilling the holes, it is necessary to grind edges of the holes, which takes time and manpower. For wind chimes connected in the form of pins, the suspension cord will probably displace in the pins, so that tone quality of the wind chimes is affected, and the pins are liable to loosen off during swinging of the wind chimes, which poses potential safety hazards.

SUMMARY OF INVENTION

To overcome the foregoing problems, the present invention proposes a novel wind chime, by providing jump rings inside the wind chime tubes, pins are replaced, and deficiencies of the prior art, for example, it is necessary to drill holes in surfaces of the wind chime tubes and grind the holes, which consumes time and manpower, affects beauty of the wind chime, deteriorates tone quality thereof and is liable to cause safety hazards, can be addressed.

The technical solution employed in the present invention is: a novel wind chime, comprising a connection ring, a plurality of suspension cords passing the connection ring, a hanger connected at upper ends of the plurality of suspension cords, a striker connected at lower ends of the plurality of suspension cord and a plurality of wind chime tubes, jump rings are connected respectively at the lower ends of the plurality of suspension cords, limiting and connection structures are respectively provided between central positions of the jump rings and the plurality of suspension cords, and the jump rings are connected at inner sides of the plurality of wind chime tubes.

Further, the limiting and connection structures are rings respectively provided at the central positions of the jump rings, the rings are respectively connected with the jump rings, central holes are provided at the rings, the plurality of suspension cords pass respectively the central holes and mounting holes are provided in the jump rings.

By the foregoing technical solution, the first kind of jump rings is designed, and during fabrication, each of the plurality of suspension cords passes one of the central holes, is tied on one of the jump rings, and joined in the mounting hole with a pneumatic plier, and the jump rings are respectively installed in the plurality of wind chime tubes, so that the plurality of suspension cords are in the central positions of the jump rings, that is, fixed in the central positions of the plurality of wind chime tubes, the tone quality is the best.

Further, the limiting and connection structures comprise a supporting rod connected respectively at an end of each of the jump rings, a clamping slot is provided at the supporting rod, wherein the clamping slot is provided at a central position of each of the jump rings and mounting holes are provided at the jump rings.

By the foregoing technical solution, the second kind of jump rings is designed, and during fabrication, the plurality of suspension cords are tied on the clamping slots, joined in the mounting holes with a pneumatic plier, and the jump rings are in turn installed inside the wind chime tubes, and as the clamping slots are at the central positions of the jump rings, the plurality of suspension cords are fixed respectively at the central positions of the plurality of wind chime tubes, the tone quality is the highest.

Further, a plurality of first cord openings are provided at an even interval in the connection ring, wherein the plurality of suspension cords respectively pass the plurality of first cord openings.

Still further, the plurality of wind chime tubes are uniformly provided around the striker and a cord holder is provided between the plurality of suspension cords and the hanger.

By the foregoing technical solution, collision is generated between the striker and the plurality of wind chime tubes, so beautiful sounds can be produced.

Further, mounting grooves are provided in the plurality of wind chime tubes, and the mounting grooves match the jump rings.

By the foregoing technical solution, design of the mounting grooves can have the jump rings joined firmly in the plurality of wind chime tubes, and the jump rings are not liable to loosen off and will not pose any safety hazard.

Further, a slotted eye is provided at a lower surface of the striker, a second cord opening is provided at a central position of the striker, wherein the second cord opening matches one of the plurality of suspension cords, and the second cord opening is collinear with a central line of the slotted eye.

Further, a positioning and locking piece is provided on the one of the plurality of suspension cords, wherein the positioning and locking piece is provided at a lower end of the striker, and one end of the positioning and locking piece can be joined in the slotted eye.

By the foregoing technical solution, the positioning and locking piece can slide along the suspension cord, and can be locked so as to control a position of the striker, and by plugging the positioning and locking piece onto the striker, the striker can be fixed.

Further, a pendant is provided at a lower end of one of the plurality of suspension cords passing the striker.

By design of the foregoing technical solution, with the pendant, the suspension cord passing the striker is kept vertical, and overall visual beauty of the wind chime is improved too.

Further, the plurality of wind chime tubes are metallic.

Compared with the prior art, the present invention has the following beneficial effects: with the technical designs of the present invention, the wind chime tubes are free from drilling and therefore it is not necessary to grind the wind chime tubes, which saves time and labor, furthermore, the plurality of suspension cords are fixed in the central positions of the plurality of wind chime tubes, so the tone quality is good while the structure is simple and utility of the present invention is high.

BRIEF DESCRIPTION OF DRAWINGS

To explain the technical solutions in embodiments of the present invention or the prior art more clearly, hereinafter a brief introduction will be given to drawings to be used in description of the embodiments or the prior art, apparently, the drawings described herein are only for some embodiments of the present invention, for those of ordinary skill in the art, it is possible to obtain other drawings based on these drawings without involving creative effort.

Figure 1:
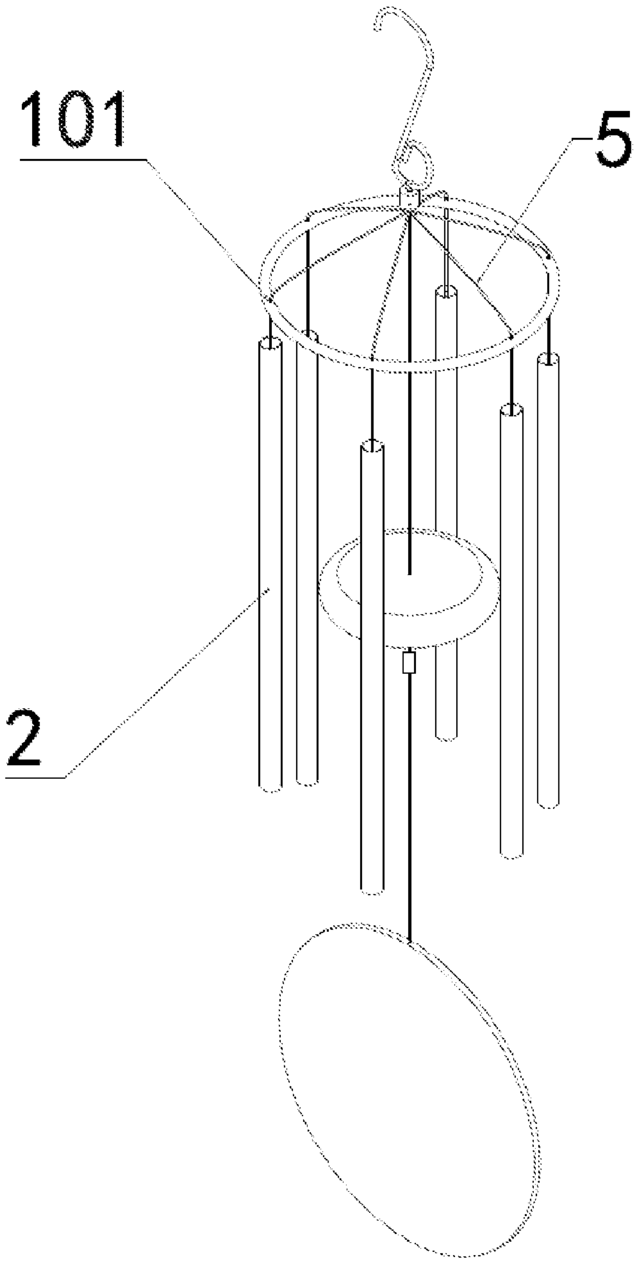
FIG. 1 is a structural diagram showing a front side of the novel wind chime according to the present invention.

Marks in the drawings are: 1—connection ring; 101—first cord opening; 2—wind chime tube; 201—mounting groove; 3—hanger; 4—pendant; 5—suspension cord; 6—cord holder; 7—striker; 701—second cord opening; 702—slotted eye; 8—jump ring; 801—central hole; 802—mounting hole; 803—supporting rod; 804—clamping slot; and 9—positioning and locking piece.

How the purpose of the present invention is realized, functions, characteristics and advantages of the present invention will be further illustrated in the embodiments in conjunction with the accompanying drawings.

EMBODIMENTS

Hereinafter the technical solutions in embodiments of the present invention will be described clearly and completely together with the accompanying drawings in the embodiments of the present invention, apparently, the embodiments described here are only some embodiments of the present invention rather than all. All other embodiments obtained by those of ordinary skill in the art without making creative effort fall into protection scope of the present invention.

It shall be noted that, all directional indications (such as upper, lower, left, right, front, and rear etc.) are only intended to describe relative spatial relationships and movement conditions between parts in a specific gesture (as shown in the drawings), when the specific gesture is changed, the directional indications will correspondingly change.

Furthermore, descriptions pertaining to “first” “second” in the present invention are only explanatory, and shall not be construed as indicating or representing relative importance thereof or implicitly indicating number of the technical features. Therefore, features modified by “first” “second” can explicitly or implicitly include at least one of the features. Furthermore, the technical solutions in each of the embodiments can be combined together, however, the premise is that those skilled in the art can realize the same, when combination of the technical solutions is contradictory or cannot be realized, it shall be considered that such combination does not exist and does not belong to the protection scope of the present invention.

Figure 2:
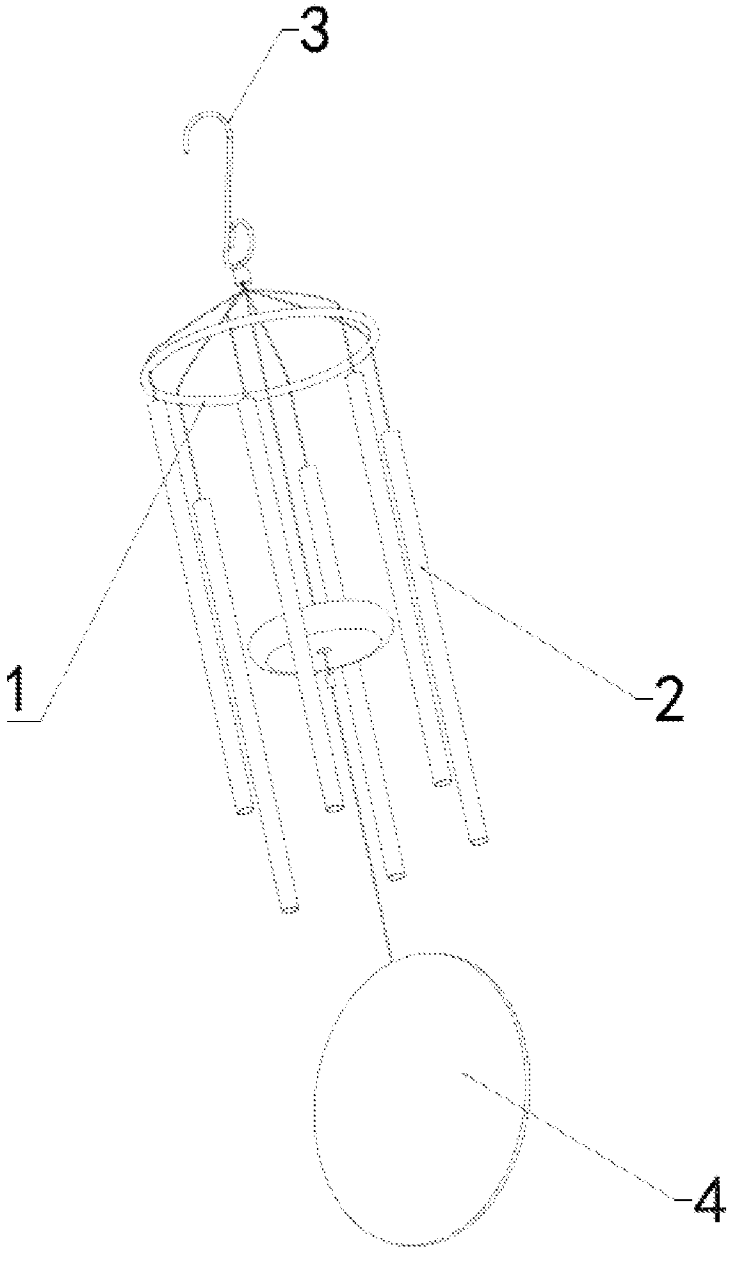
FIG. 2 is a left, axonometric diagram showing the novel wind chime according to the present invention.
Figure 3:
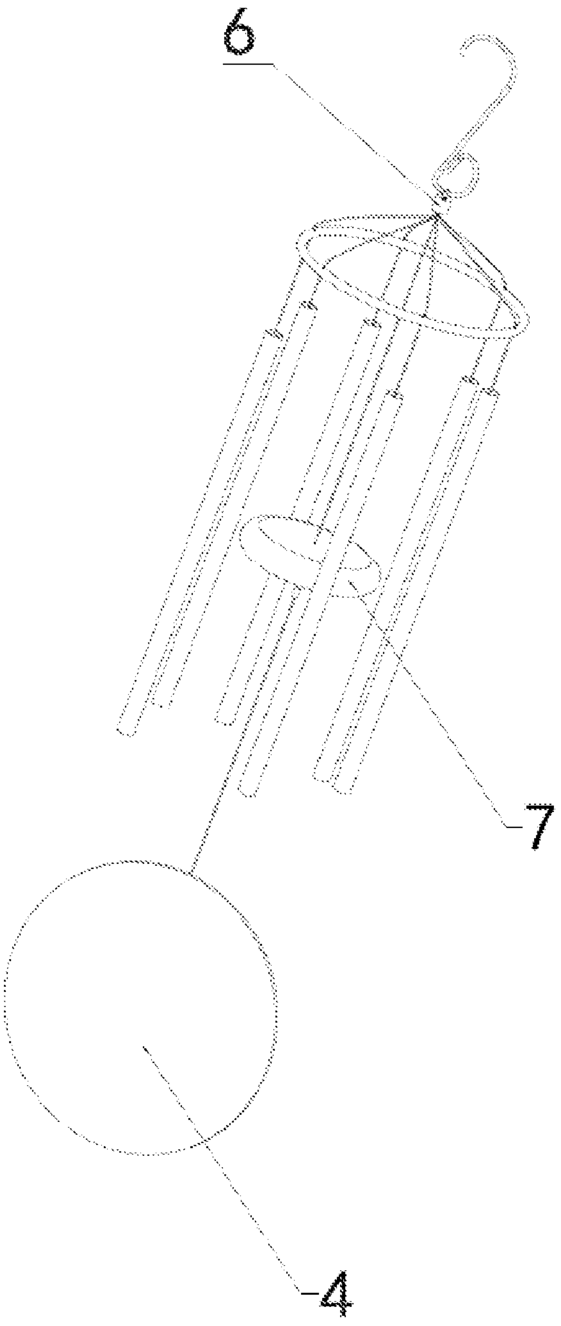
FIG. 3 is a right, axonometric diagram showing the novel wind chime according to the present invention.
Figure 4:
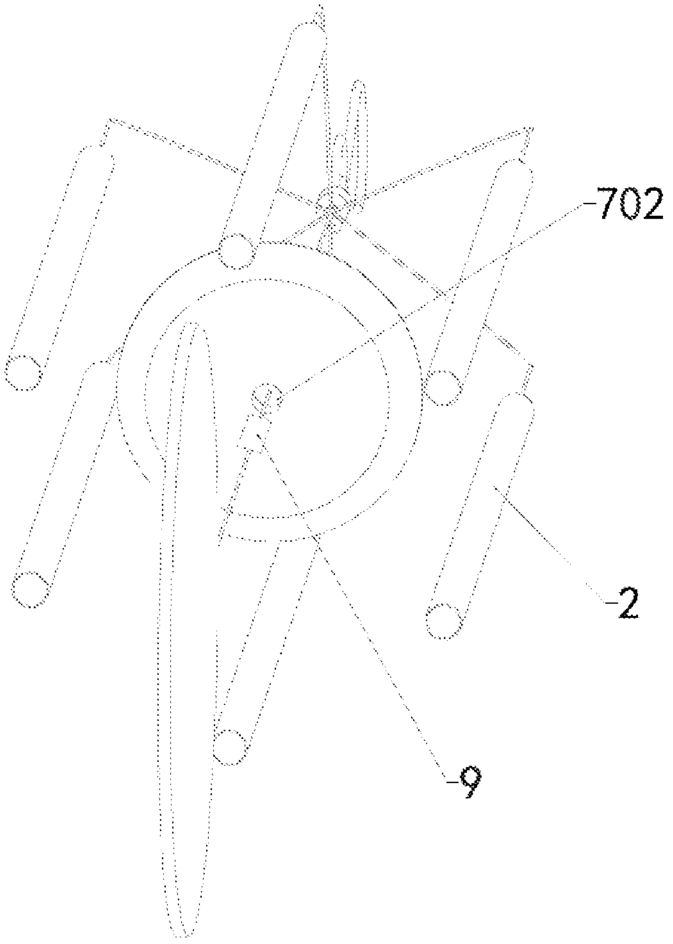
FIG. 4 is a lower, axonometric diagram showing the novel wind chime according to the present invention.
Figure 5:
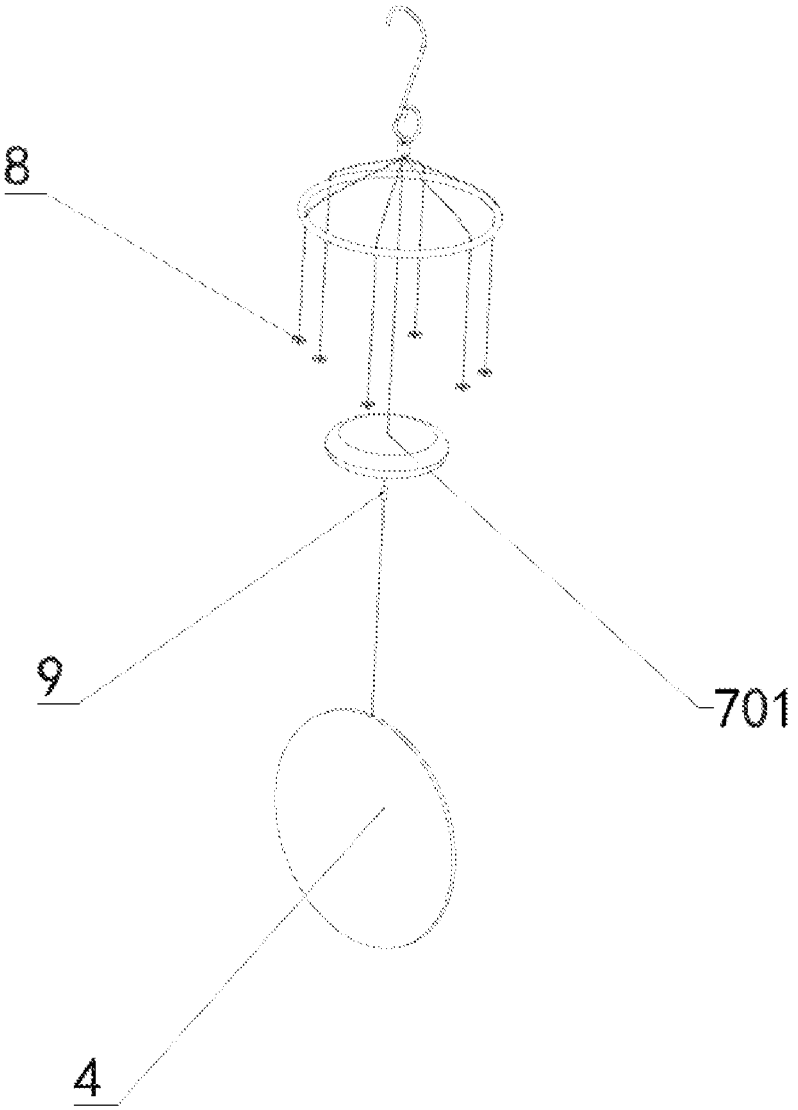
FIG. 5 is a rear, axonometric diagram showing the novel wind chime without the plurality of wind chime tubes according to the present invention.
Figure 6:
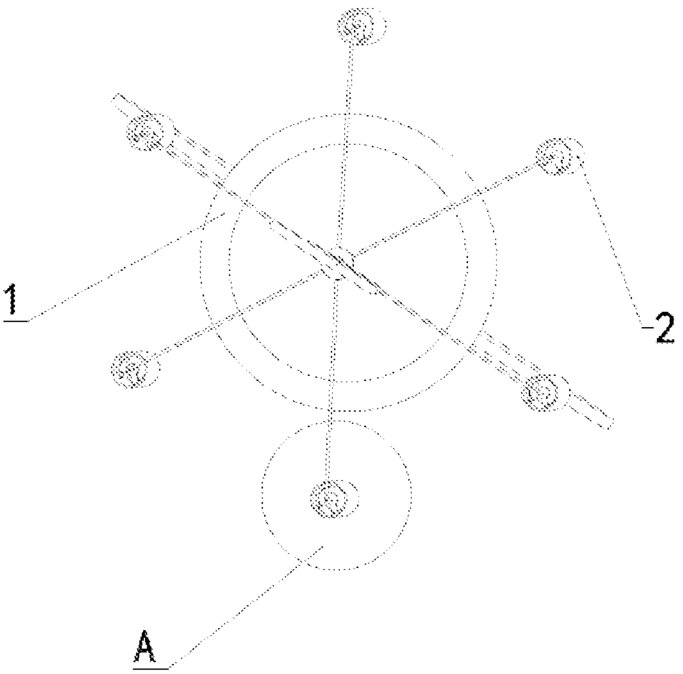
FIG. 6 is a bottom view showing the novel wind chime without the connection ring according to the present invention.
Figure 7:
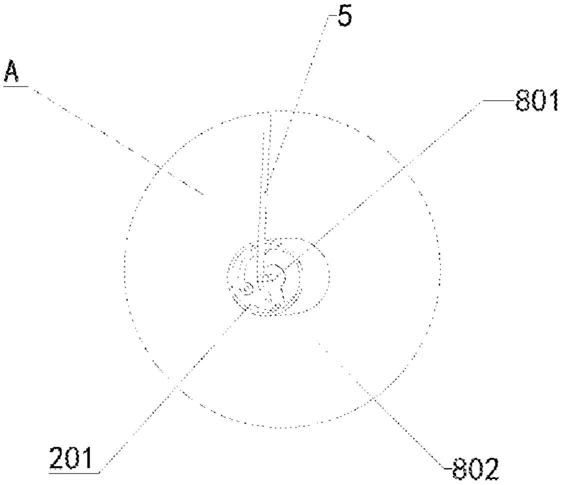
FIG. 7 is a partially enlarged view showing a part A of the novel wind chime according to the present invention.
Figure 8:
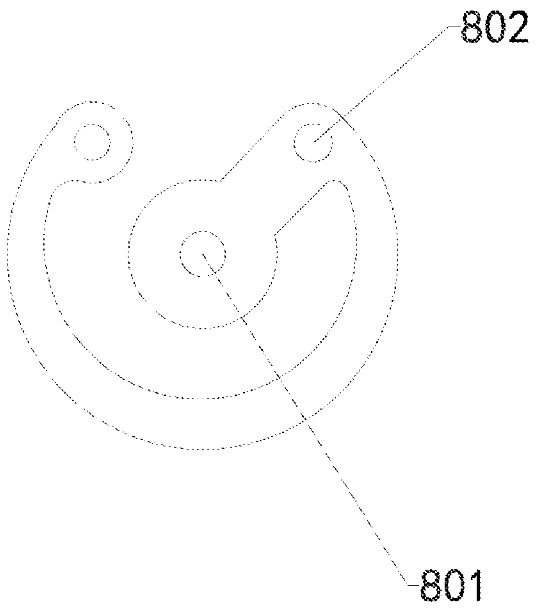
FIG. 8 is a diagram showing the first kind of jump rings in the novel wind chime according to the present invention.
Figure 9:
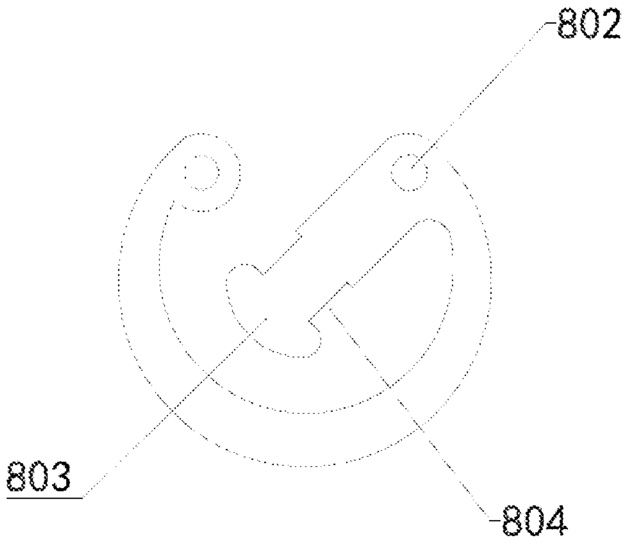
FIG. 9 is a diagram showing the second kind of jump rings in the novel wind chime according to the present invention.
Figure 10:
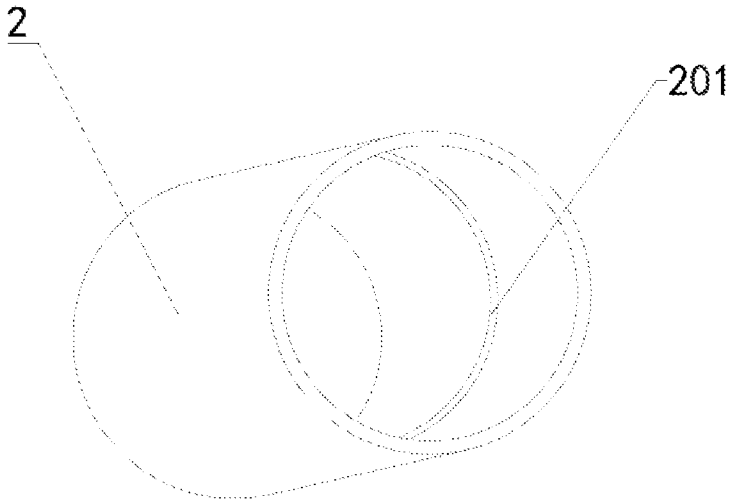
FIG. 10 is an axonometric structural diagram showing one of the plurality of wind chime tubes in the novel wind chime according to the present invention.

Embodiments: with reference to FIG. 1 to FIG. 10, the present invention relates to a novel wind chime, comprising a connection ring 1, a plurality of suspension cords 5 passing the connection ring 1, a hanger 3 connected at upper ends of the plurality of suspension cords, a striker and a plurality of wind chime tubes 2 connected at lower ends of the plurality of suspension cords 5, wherein jump rings 8 are provided respectively at the lower ends of the plurality of suspension cords 5, limiting and connection structures are provided between central positions of the jump rings 8 and the plurality of suspension cords 5, and the jump rings 8 are connected respectively at inner sides of the plurality of wind chime tubes 2.

As a preferred embodiment of the present invention, each of the limiting and connection structures comprises a ring provided at a central position of each of the jump rings 8, the ring is connected to an end of the jump ring 8, a central hole 801 is provided in a center of the ring, one of the plurality of suspension cords 5 passes the central hole 801, and a mounting hole 802 is provided on each of the jump rings 8.

In the present embodiment, a first kind of the jump rings 8 is provided, during manufacturing, pass one of the plurality of suspension cords 5 through the central hole 801 and tie the same on the corresponding jump ring 8, join the same to the mounting hole 802 with a pneumatic plier, and install the jump rings 8 respectively in the plurality of wind chime tubes 2, wherein the plurality of suspension cords 5 are fixed at the central positions of the jump rings 8, that is, fixed in centers of the plurality of wind chime tubes 2, the tone quality is the best.

As another preferred embodiment of the present invention, the limiting and connection structures are supporting rods 803 connected at ends of the jump rings 8, clamping slots 804 are provided at the supporting rods 803, the clamping slots 804 are at the central positions of the jump rings 8 and a mounting hole 802 is provided on each of the jump rings 8.

In the present embodiment, a second kind of the jump rings 8 is provided, during manufacturing, tie the plurality of suspension cords 5 on the clamping slots 804, join the same to the mounting holes 802 with a pneumatic plier, install the jump rings 8 in the plurality of wind chime tubes 2, and as the clamping slots 804 are in the central positions of the jump rings 8, the plurality of suspension cords 5 are kept in centers of the plurality of wind chime tubes 2, therefore the tone quality is the best.

Specifically, a plurality of first cord openings 101 are provided at an even interval in the connection ring 1, and the plurality of suspension cords 5 match and pass the plurality of first cord openings 101 respectively.

Specifically, the plurality of wind chime tubes 2 are provided around the striker 7 uniformly, and a cord holder 6 is provided between the plurality of suspension cords 5 and the hanger 3.

In the present embodiment, collision happens between the striker 7 and the plurality of wind chime tubes 2, so as to produce beautiful sounds, and design of the cord holder 6 has all the plurality of suspension cords 5 hanging at the same point.

Furthermore, mounting grooves 201 are circumferentially provided in the plurality of wind chime tubes 2, and the mounting grooves 201 match external profiles of the jump rings 8.

By the foregoing technical design, design of the mounting grooves 201 can have the jump rings 8 fixed in the plurality of wind chime tubes 2, without loosening off and posing any safety hazard.

Further, a slotted eye 702 is provided at a lower surface of the striker, a second cord opening 701 is provided in a center of the striker 7, wherein the second cord opening 701 matches one of the plurality of suspension cords 5, and the second cord opening 701 is collinear with a central line of the slotted eye.

Specifically, a positioning and locking piece 9 is provided on one of the plurality of suspension cords 5, the positioning and locking piece 9 is fixed at a lower end of the striker 7, and an end of the positioning and locking piece 9 can be connected in the slotted eye 702.

In the present embodiment, the positioning and locking piece 9 can slide along the suspension cord 5, and can be locked so as to control a position of the striker 7, and by plugging the positioning and locking piece in the striker 7 the striker 7 can be fixed.

In the present embodiment, a pendant 4 is provided at an end of one of the plurality of suspension cords passing the striker 7, and with the pendant 4 the striker 7 can be kept vertical, and overall beauty of the wind chime can be improved.

More specifically, the plurality of wind chime tubes 2 are metallic.

The foregoing are only some preferred embodiments of the novel wind chime according to the present invention, and are not intended to restrict protection scope of the present invention, equivalent structural replacement made based on contents disclosed in the specification and drawings of the present invention and direct or indirect use of the present invention in other relevant fields are covered in the protection scope of the present invention.

I claim:

1. A novel wind chime, comprising a connection ring, a plurality of suspension cords passing the connection ring, a hanger connected at upper ends of the plurality of suspension cords, a striker and a plurality of wind chime tubes connected at lower ends of the plurality of suspension cord, wherein jump rings are connected respectively at the lower ends of the plurality of suspension cords, limiting and connection structures are provided between central positions of the jump rings and the plurality of suspension cords, and the jump rings are connected at inner sides of the plurality of wind chime tubes.

2. The novel wind chime according to claim 1, wherein the limiting and connection structures are rings provided at the central positions of the jump rings, the rings are respectively connected with the jump rings, central holes are formed at the rings, the plurality of suspension cords pass respectively the central holes and mounting holes are formed in the jump rings.

3. The novel wind chime according to claim 1, wherein the limiting and connection structures comprise a supporting rod connected respectively at an end of each of the jump rings, a clamping slot is formed at the supporting rod, wherein the clamping slot is formed at a central position of each of the jump rings and mounting holes are formed at the jump rings.

4. The novel wind chime according to claim 1, wherein a plurality of first cord openings are formed at an even interval in the connection ring, wherein the plurality of suspension cords respectively pass the plurality of first cord openings.

5. The novel wind chime according to claim 4, wherein the plurality of wind chime tubes are provided around the striker in an even interval and a cord holder is provided between the plurality of suspension cords and the hanger.

6. The novel wind chime according to claim 5, wherein mounting grooves are formed in the plurality of wind chime tubes, and the mounting grooves match the jump rings.

7. The novel wind chime according to claim 5, wherein a slotted eye is formed at a lower surface of the striker, a second cord opening is formed at a central position of the striker, wherein the second cord opening matches one of the plurality of suspension cords, and the second cord opening is collinear with a central line of the slotted eye.

8. The novel wind chime according to claim 6, wherein a slotted eye is formed at a lower surface of the striker, a second cord opening is formed at a central position of the striker, wherein the second cord opening matches one of the plurality of suspension cords, and the second cord opening is collinear with a central line of the slotted eye.

9. The novel wind chime according to claim 7, wherein a positioning and locking piece is provided on the one of the plurality of suspension cords, wherein the positioning and locking piece is connected at a lower end of the striker, and one end of the positioning and locking piece is joined in the slotted eye.

10. The novel wind chime according to claim 8, wherein a positioning and locking piece is provided on the one of the plurality of suspension cords, wherein the positioning and locking piece is formed at a lower end of the striker, and one end of the positioning and locking piece is joined in the slotted eye.

11. The novel wind chime according to claim 1, wherein a pendant is connected at a lower end of one of the plurality of suspension cords passing the striker.

12. The novel wind chime according to claim 1, wherein the plurality of wind chime tubes are metallic.

* * * * *